(12) United States Patent
Lee et al.

(10) Patent No.: US 9,541,702 B2
(45) Date of Patent: Jan. 10, 2017

(54) DISPLAY DEVICE

(71) Applicant: SAMSUNG DISPLAY CO., LTD., Yongin, Gyeonggi-Do (KR)

(72) Inventors: Jae Sang Lee, Cheonan-si (KR); Jin Seo, Osan-si (KR); Hyung Jin Kim, Seoul (KR); Joong-Hyun Kim, Asan-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 96 days.

(21) Appl. No.: 14/268,285

(22) Filed: May 2, 2014

(65) Prior Publication Data

US 2014/0241010 A1    Aug. 28, 2014

Related U.S. Application Data

(62) Division of application No. 13/292,534, filed on Nov. 9, 2011, now Pat. No. 8,752,998.

(30) Foreign Application Priority Data

Jul. 6, 2011  (KR) .................. 10-2011-0067028

(51) Int. Cl.
  *F21V 8/00* (2006.01)
  *G02F 1/1335* (2006.01)
  *G02F 1/1333* (2006.01)

(52) U.S. Cl.
  CPC ........... *G02B 6/0081* (2013.01); *G02B 6/0088* (2013.01); *G02F 1/133615* (2013.01);
  (Continued)

(58) Field of Classification Search
  CPC ..... G02B 6/0088; G02B 6/008; G02B 6/0046; G02B 6/0093; G02B 6/0028; G02B 6/0025; G02B 6/0031; G02B 6/0076; G02B 6/0081; G02F 1/133615; G02F 1/133308; G02F 2201/46; G02F 1/1336; G02F 2201/54; G02F 2001/133314; H05K 2201/10136; B29D 11/006
  See application file for complete search history.

(56) References Cited

U.S. PATENT DOCUMENTS 6,538,710 B1    3/2003  Jang
6,950,154 B2    9/2005  Lee
(Continued)

FOREIGN PATENT DOCUMENTS

CN        1461965 A      12/2003
CN      201739834 U       2/2011
(Continued)

OTHER PUBLICATIONS

EP Partial Search Report dated Oct. 15, 2012.
The Extended European Search Report for European patent application No. 11191446.1 mailing date of Jan. 4, 2013.

*Primary Examiner* — Stephen F Husar
*Assistant Examiner* — Danielle Allen
(74) *Attorney, Agent, or Firm* — Cantor Colburn LLP

(57) ABSTRACT

A display device includes: a first chassis including a bottom surface, and a side wall which extends from an edge of the bottom surface; a light guide plate in the first chassis; a first fixing member which overlaps the side wall of the first chassis and contacts an upper surface of the light guide plate; and a first fastening member which fastens the first fixing member to the side wall of the first chassis. The first chassis includes a groove which extends through the side wall of the first chassis, the light guide plate includes a first protrusion which protrudes from an edge of the light guide plate and extends into the groove, and the first fixing member contacts
(Continued)

an upper surface of the first protrusion of the light guide plate.

6 Claims, 15 Drawing Sheets

(52) U.S. Cl.
CPC ............ *G02F 2001/133314* (2013.01); *G02F 2201/46* (2013.01); *G02F 2201/54* (2013.01)

(56) References Cited

U.S. PATENT DOCUMENTS

| | | |
|---|---|---|
| 2003/0223020 A1* | 12/2003 | Lee .................................. 349/58 |
| 2007/0002591 A1 | 1/2007 | Chang et al. |
| 2008/0088767 A1 | 4/2008 | Chen et al. |
| 2008/0144337 A1 | 6/2008 | Li |
| 2009/0237590 A1 | 9/2009 | Kwon et al. |
| 2010/0172154 A1 | 7/2010 | Takeuchi et al. |
| 2010/0289979 A1 | 11/2010 | Lee |
| 2011/0007235 A1 | 1/2011 | Chang |
| 2011/0044071 A1 | 2/2011 | Cho et al. |
| 2011/0058355 A1 | 3/2011 | Teng et al. |
| 2011/0149602 A1 | 6/2011 | Lee et al. |

FOREIGN PATENT DOCUMENTS

| | | |
|---|---|---|
| JP | 2004258236 A | 9/2004 |
| JP | 2009-282435 A | 3/2009 |
| JP | 4290469 B2 | 4/2009 |
| JP | 2010237548 A | 10/2010 |
| JP | 2012-054108 A | 3/2012 |
| JP | 4069763 B2 | 5/2014 |
| KR | 1020050008278 A | 1/2005 |
| KR | 100666321 B1 | 1/2007 |
| KR | 100943509 B1 | 2/2010 |
| KR | 100960165 B1 | 5/2010 |
| KR | 1020110066789 A | 6/2011 |
| TW | 2008019845 A | 5/2008 |

* cited by examiner

DISPLAY DEVICE

This application is a divisional application of U.S. application Ser. No. 13/292,534 filed Nov. 9, 2011, which claims priority to Korean Patent Application No. 10-2011-0067028 filed on Jul. 6, 2011, and all the benefits accruing therefrom under §119, the entire contents of which are incorporated herein by reference.

BACKGROUND OF THE INVENTION (a) Field of the Invention

The invention relates to a display device, and more particularly, to a display device capable of reducing a bezel space that is not used for displaying images on a screen.

(b) Description of the Related Art

A computer monitor, a television, a mobile phone or the like that are widely used need a display device. Examples of the display device are a cathode ray tube display device, a liquid crystal display and a plasma display device.

A liquid crystal display, which is one of the most common types of flat panel displays in use, includes two sheets of display panels on which field generating electrodes such as a pixel electrode and a common electrode are formed, and a liquid crystal layer that is interposed therebetween. The liquid crystal display displays an image by applying voltage to the field generating electrodes to generate an electric field on the liquid crystal layer, thereby determining orientations of liquid crystal molecules of the liquid crystal layer and controlling the polarization of incident light.

Since the liquid crystal display is not a self-luminous device, the liquid crystal display needs a light source. In this case, the light source may be a separately mounted artificial light source or natural light. Examples of the artificial light source used in the liquid crystal display are a light emitting diode ("LED"), a cold cathode fluorescent lamp ("CCFL"), and an external electrode fluorescent lamp ("EEFL").

In order for light emitted from the artificial light source to reach the entire display panel uniformly, a light guide plate ("LGP") is required.

The liquid crystal display includes a bottom chassis receiving constituent elements such as a display panel, a light source and a light guide plate. The constituent elements need to be fixed to the bottom chassis so as to prevent the constituent elements from being separated and damaged during processes of manufacturing and transporting the liquid crystal display.

In the related art, a groove is formed on a light guide plate and a pin passing through the groove is pressed into the bottom chassis, thereby fixing the light guide plate to the bottom chassis. As a result, a bezel space that is not used for displaying a screen increases.

In addition, since the light guide plate continues to be heated by the light source while being fixed to the bottom chassis, the light guide plate may be deformed at high temperature and humidity. In this case, since the light source is also fixed to the bottom chassis, the distance between the light source and the light guide plate is designed to be widened in order to prevent the light source from being influenced by the deformation of the light guide plate, which increases the bezel space that is not used for displaying images on a screen.

BRIEF SUMMARY OF THE INVENTION

The invention has been made in an effort to provide a display device having an advantage of reducing a bezel space that is not used for displaying images on a screen.

An exemplary embodiment of the invention provides a display device including: a first chassis including a bottom surface, and a side wall which extends from an edge of the bottom surface; a light guide plate in the first chassis; a first fixing member which overlaps the side wall of the first chassis and contacts an upper surface of the light guide plate; and a first fastening member which fastens the first fixing member to the side wall of the first chassis. The first chassis includes a groove which extends through the side wall of the first chassis, the light guide plate includes a first protrusion which protrudes from an edge of the light guide plate and extends into the groove, and the first fixing member contacts an upper surface of the first protrusion of the light guide plate.

The first fixing member may include a first fixing part which overlaps the side wall of the first chassis and is parallel to the side wall; a bending part which extends from the first fixing part toward an inside of the side wall of the first chassis; and a second fixing part which extends from the bending part toward the bottom surface of the first chassis, and contacts the upper surface of the first protrusion of the light guide plate.

The display device may further include a sheet in the first chassis and on the light guide plate. The sheet may include a second protrusion which protrudes from an edge of the sheet and is parallel to the first protrusion of the light guide plate; and a hole which penetrates through a thickness of the second protrusion. The second fixing part of the first fixing member may extend into the hole of the sheet.

The first fixing member may include the first fixing part which overlaps the side wall of the first chassis and is parallel to the side wall; and a second fixing part which extends from the first fixing part toward an inside the side wall of the first chassis and contacts the upper surface of the first protrusion of the light guide plate.

The display device may further include a sheet in the first chassis and on the light guide plate, a second fixing member which overlaps the side wall of the first chassis and contacts an upper surface of the sheet; and a second fastening member which fastens the second fixing member to the side wall of the first chassis.

The sheet may include a second protrusion which protrudes from an edge of the sheet; and a hole which penetrates through a thickness of the second protrusion. The second fixing member may extend into the hole of the sheet.

Another exemplary embodiment of the invention provides a display device including: a first chassis including a bottom surface, and a side wall which extends from an edge of the bottom surface; an auxiliary chassis on two opposing sides of the first chassis facing each other, such that the auxiliary chassis moves with respect to the bottom surface of the first chassis; and a light guide plate in the first chassis and the auxiliary chassis, and fixed to the auxiliary chassis.

The first chassis may include a first groove which extends through the side wall of the first chassis, the light guide plate may include a first protrusion which protrudes from an edge of the light guide plate and extends into the first groove of the side wall; and may further include a second protrusion which has a width smaller than that of the first groove and protrudes from the edge of the light guide plate.

The display device may further include a first fixing member which fixes the light guide plate to the auxiliary chassis. The first fixing member may include a first fixing part which is parallel to the side wall and has a '⊂' shape, such that the second protrusion extends into the '⊂' shape; and a second fixing part which is bent from the first fixing part and faces a lower surface of the auxiliary chassis.

The display device may further include a first fastening member which fastens the first fixing member to the auxiliary chassis.

The auxiliary chassis may include second and third grooves which extend towards an inside of the auxiliary chassis from a lateral surface which is parallel to the side wall, and the first fixing member may further include a third fixing part which protrudes from the second fixing part toward the auxiliary chassis, and extends into the second and third grooves of the auxiliary chassis.

The display device may include a second chassis which is fixed to the auxiliary chassis.

The display device may further include a second fixing member which movably fixes the auxiliary chassis to the first chassis, and the auxiliary chassis may include a hole through which the second fixing member passes.

The second fixing member may include a head part having a width larger than that of the hole of the auxiliary chassis; an intermediate part which extends from the head part and has a width smaller than that of the hole; and a fastening part which extends from the intermediate part and has a threaded outer surface.

A difference between the widths of the hole and the moving part may be about 0.8 millimeter (mm) to about 1.2 millimeters (mm).

The display device further includes a liquid crystal panel in the first chassis and on the light guide plate. When a diagonal length of the liquid crystal panel is about 55 inches, about 46 inches, and about 40 inches, the difference between the widths of the hole and the intermediate part may be about 1.2 mm, about 1.0 mm, and about 0.8 mm, respectively.

A height of the intermediate part may be larger than a thickness of the auxiliary chassis.

The display device may further include a light source which is fixed to the auxiliary chassis and faces a lateral surface of the light guide plate.

A distance between the light guide plate and the light source may be about 0.6 mm or less.

The display device has the following advantages.

According to the exemplary embodiments of the invention, the first chassis includes the groove and the light guide plate includes the protrusion so that the protrusion extends into and is fixed to the groove, thereby reducing a bezel space which is not used for displaying a screen.

Further, according to the exemplary embodiments of the invention, the fixing member presses the light guide plate, the sheet, and the like downward toward the first chassis when the light guide plate, the sheet, and the like are fixed to the first chassis, such that the light guide plate, the sheet, and the like are fixed not only in an X-Y direction, but even fixed vertically in a Z direction, to be fixed more firmly within the first chassis.

In addition, according to the exemplary embodiments of the invention, the light guide plate is fixed to the first chassis and the auxiliary chassis, respectively, and the auxiliary chassis is movable with respect to the first chassis, such that when the light guide plate is deformed due to high temperature and humidity, the auxiliary chassis moves. Therefore, it is possible to prevent the light source fixed to the auxiliary chassis from being influenced by the deformed light guide plate.

Moreover, according to the exemplary embodiments of the invention, since the distance between the light guide plate and the light source is minimized, it is possible to increase luminance by reducing loss of light emitted from the light source and to reduce a bezel space which is not used for displaying a screen.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1:
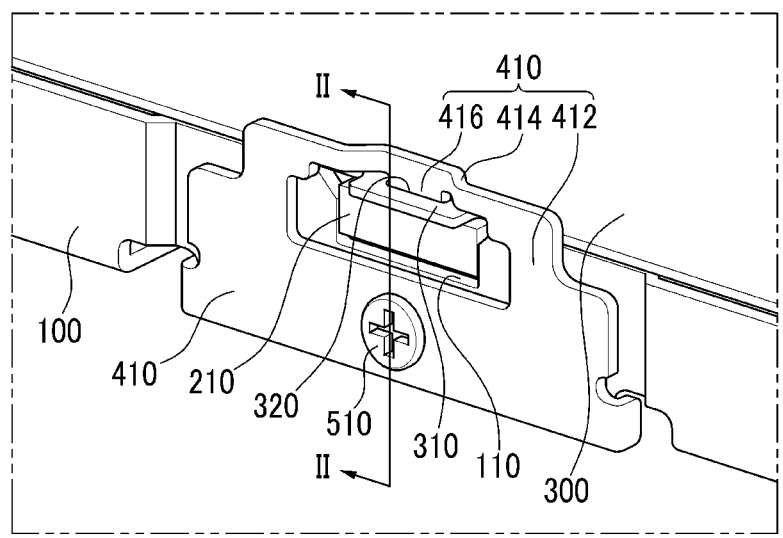
FIG. 1 is a partial perspective view of an exemplary embodiment of a display device according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region or substrate is referred to as being "on" another element, it can be directly on the other element or intervening elements may also be present. In contrast, when an element is referred to as being "directly on" another element, there are no intervening elements present.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath," "lower," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "beneath" or "lower" relative to other elements or features would then be oriented "above" or "upper" relative to the other elements or features. Thus, the exemplary term "beneath" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the invention will be described in detail with reference to the accompanying drawings.

First, an exemplary embodiment of a display device according to the invention will be described hereafter with reference to the accompanying drawings.

Figure 2:
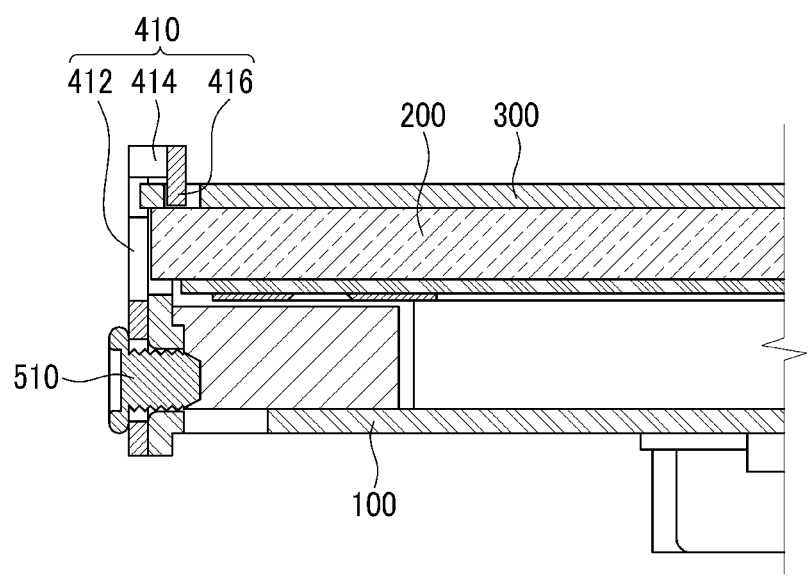
FIG. 2 is a cross-sectional view taken along line II-II of FIG. 1.
Figure 3:
FIG. 3 is a top plan view of an exemplary embodiment of a light guide plate of the display device of FIG. 1 according to the invention.
Figure 4:
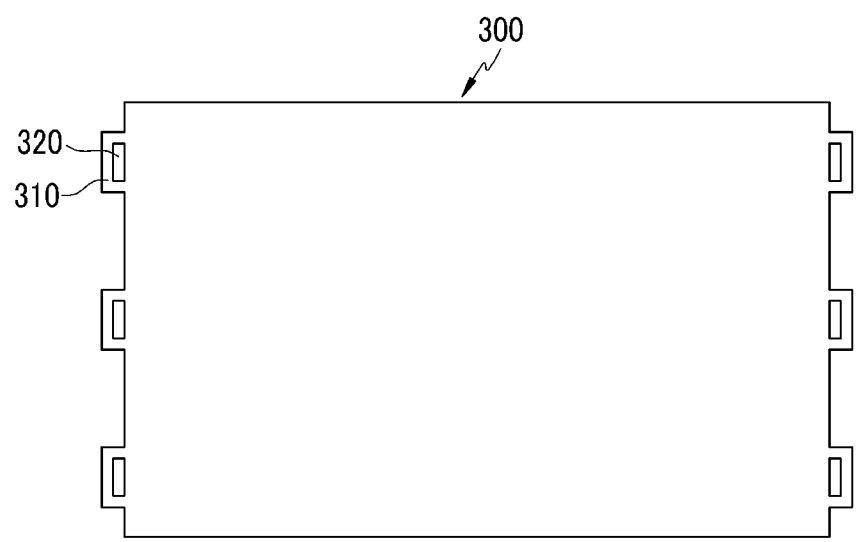
FIG. 4 is a top plan view of an exemplary embodiment of a sheet of the display device of FIG. 1 according to the invention.
Figure 5:
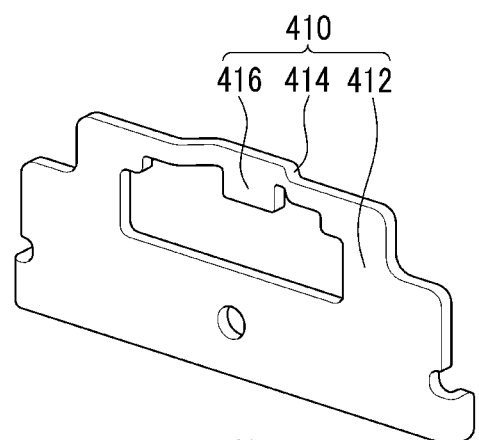
FIG. 5 is a perspective view of an exemplary embodiment of a first fixing member of the display device of FIG. 1 according to the invention.

FIG. 1 is a partial perspective view of an exemplary embodiment of a display device according to the invention, FIG. 2 is a cross-sectional view taken along line II-II of FIG. 1, FIG. 3 is a top plan view of an exemplary embodiment of a light guide plate of the display device of FIG. 1 according to the invention, FIG. 4 is a top plan view of an exemplary embodiment of a sheet of the display device of FIG. 1 according to the invention, and FIG. 5 is a perspective view of an exemplary embodiment of a first fixing member of the display device of FIG. 1 according to the invention.

The display device includes a first chassis 100, a light guide plate 200 received in the first chassis 100, a first fixing member 410 covering (e.g., overlapping) a portion of a side wall of the first chassis 100 and contacting a top of the light guide plate 200, and a first fastening member 510 fastening the first fixing member 410 to the first chassis 100.

The first chassis 100 has a space to receive constituent elements of the display device and includes a bottom surface, and the side wall extended from an edge of the bottom surface. A groove 110 is on the side wall of the first chassis 100, for example, extending completely through a thickness of the side wall. The first chassis 100 may include a plurality of grooves 110.

The light guide plate 200 for uniformly transmitting light emitted from a light source (not shown) to the entire surface of the display device may include acrylic injection-molded material. The light guide plate 200 includes a first protrusion 210 that protrudes from an edge of a main portion of the light guide plate 200 and is inserted into the groove 110 of the first chassis 100. The main portion of the light guide plate transmits the light emitted from the light source. The light guide plate 200 may include a plurality of first protrusions 210. The first protrusion 210 and the main portion of the light guide plate 200 may collectively form a single, unitary, indivisible member.

As shown in FIG. 3, the light guide plate 200 may have a substantially quadrangular shape in the plan view, and the first protrusions 210 of the light guide plate 200 may be on sides facing each other. Therefore, the grooves 110 of the first chassis 100 and the first protrusions 210 of the light guide plate 200 are fixed on the sides facing each other, such that the light guide plate 200 is fixed in X-axis and Y-axis directions with respect to the first chassis 100 in the plan view.

The first fixing member 410 contacts and presses the first protrusion 210 of the light guide plate 200. The first fixing member 410 includes a fixing part 412 covering the portion of the side wall of the first chassis 100, a bending part 414 bending toward an inside of the side wall of the first chassis 100 from the first fixing part 412, and a second fixing part 416 bending downward toward the bottom surface of the bottom chassis 100 from the bending part 414 and contacting and pressing the first protrusion 210. The first and second fixing parts 412 and 416 are on different planes parallel to the side wall of the first chassis 100. The first and second fixing parts 412 and 416, and the bending part 414 may collectively form a single, unitary, indivisible member.

The first fastening member 510 may be a screw, and the first fixing member 410 and the first chassis 100 may be fastened by tightening the first fastening member 510 into aligned openings in the first fixing member 410 and the first chassis 100. In this time, fastening members other than the screw may be used.

The display device according to the invention is received in the first chassis 100 and may further include a sheet 300 positioned on the light guide plate 200.

The sheet 300 includes a second protrusion 310 protruding from an edge of a main portion of the sheet 300 to be parallel to the first protrusion 210 of the light guide plate 200, and a hole 320 penetrating through a thickness in a partial region of the second protrusion 310. The second fixing part 416 of the first fixing member 410 is inserted into the hole 320 of the sheet 300. The sheet 300 may include a plurality of second protrusions 310 and a plurality of holes 320. The sheet 300 may be any of a number of various films, and examples thereof include, but are not limited to, a protection film, a diffusion film, and a luminance enhancement film. The second protrusion 310 and the main portion of the sheet 300 may collectively form a single, unitary, indivisible member.

As shown in FIG. 4, the sheet 300 may have a substantially quadrangular shape, and the second protrusions 310 of the sheet 300 may be formed on sides facing each other. As a result, since the grooves 110 of the first chassis 100 and the second protrusions 310 of the sheet 300 are fixed on the sides facing each other, the sheet 300 is fixed in X-axis and Y-axis directions with respect to the first chassis 100, in the plan view.

The second fixing part 416 of the first fixing member 410 is inserted into the hole 320 of the sheet 300 and contacts and presses the first protrusion 210 of the light guide plate 200, such that the light guide plate 200 and the sheet 300 are fixed in a Z-axis direction, orthogonal to both the X-axis and Y-axis directions, with respect to the first chassis 100.

Another exemplary embodiment of a display device according to the invention will be described hereafter with reference to the accompanying drawings.

Figure 6:
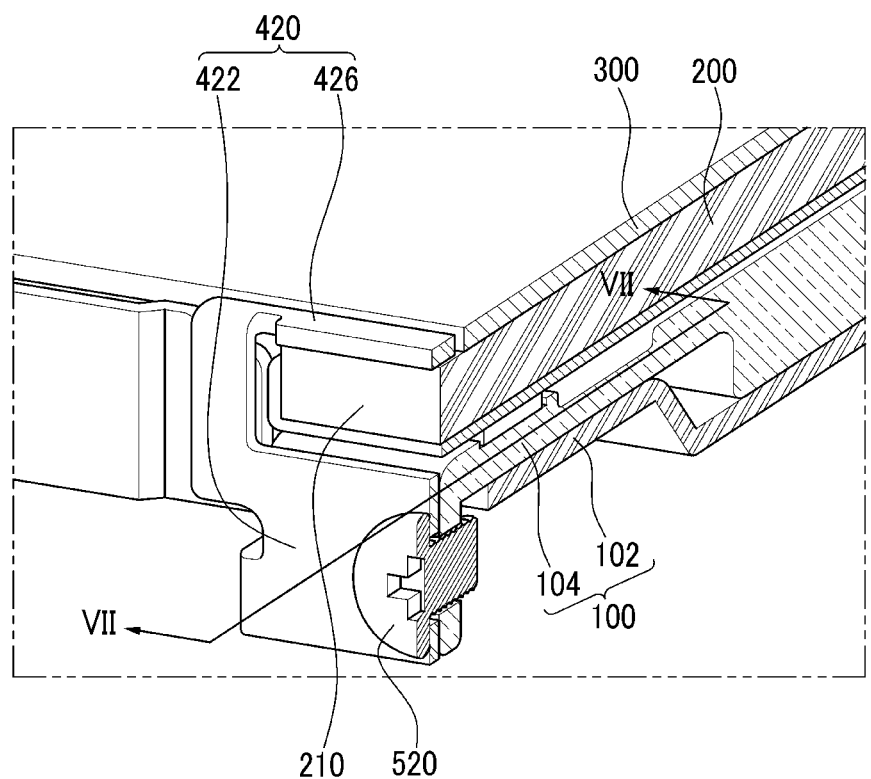
FIG. 6 is a partially cut-away perspective view of another exemplary embodiment of a display device according to the invention.
Figure 7:
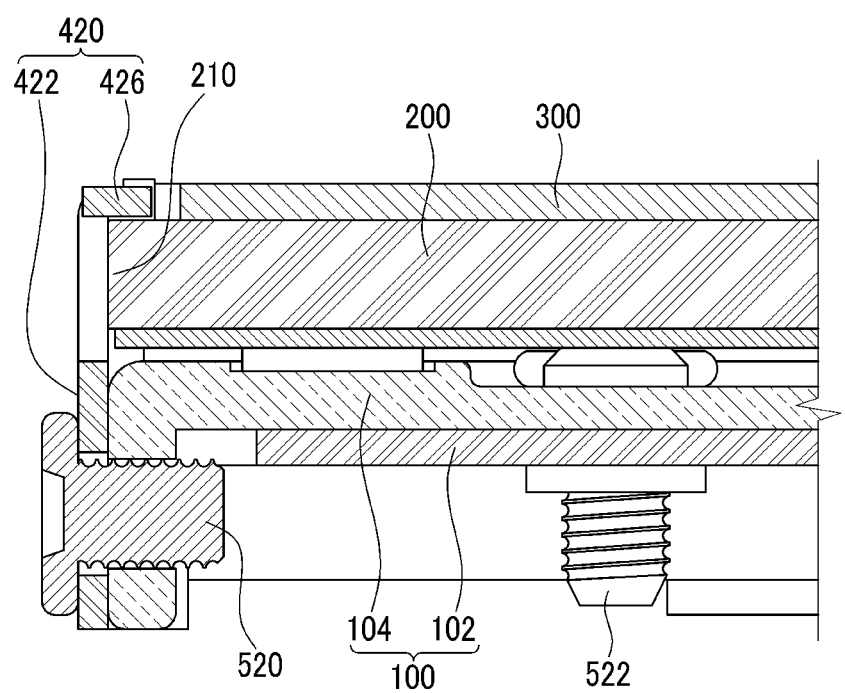
FIG. 7 is a cross-sectional view taken along line VII-VII of FIG. 6.
Figure 8:
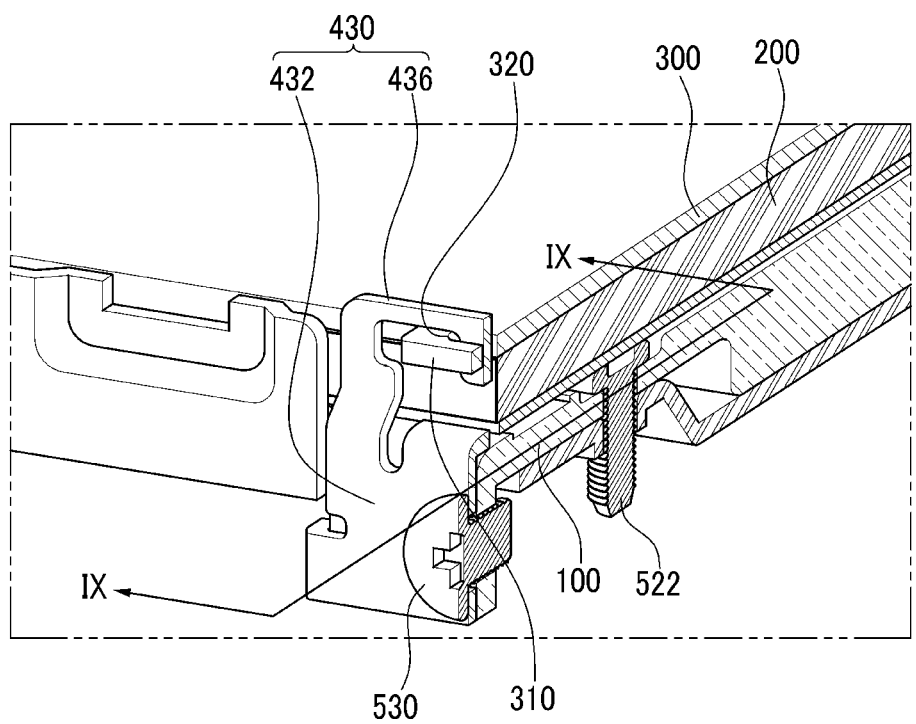
FIG. 8 is an additional partially cut-away perspective view of the another exemplary embodiment of the display device according to the invention.
Figure 9:
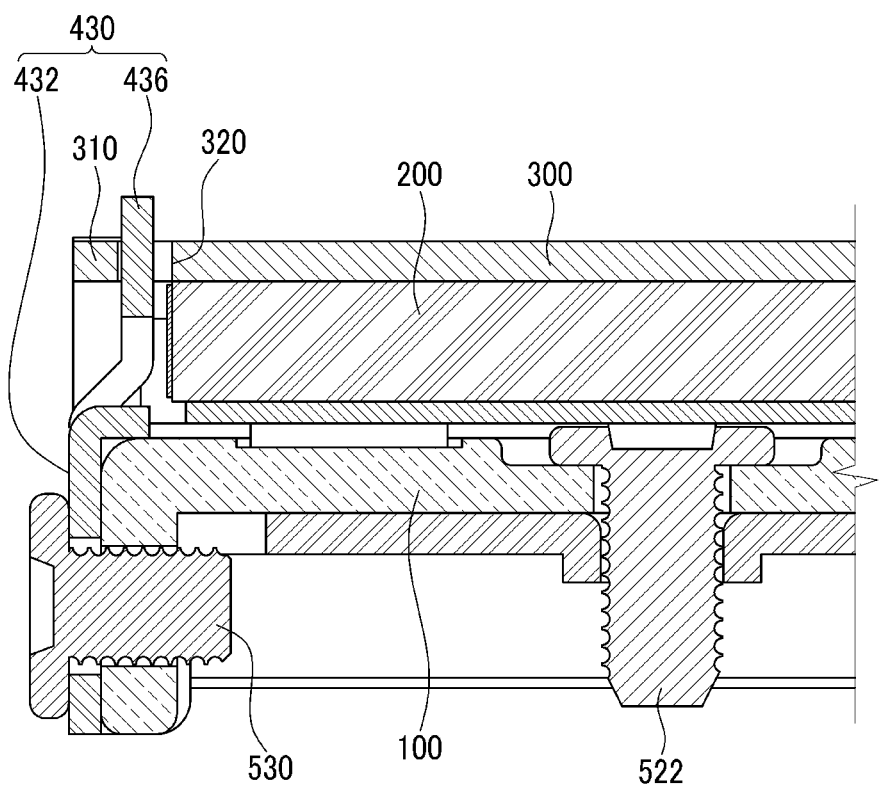
FIG. 9 is a cross-sectional view taken along line IX-IX of FIG. 8.

FIG. 6 is a partially cut-away perspective view of another exemplary embodiment of a display device according to the invention, FIG. 7 is a cross-sectional view taken along line VII-VII of FIG. 6, FIG. 8 is an additional partially cut-away perspective view of the another exemplary embodiment of the display device according to the invention, and FIG. 9 is a cross-sectional view taken along line IX-IX of FIG. 8.

As shown in FIGS. 6 and 7, the display device includes a first chassis 100, a light guide plate 200 received in the first chassis 100, a first fixing member 420 covering a portion of a side wall of the first chassis 100 and contacting a top of the light guide plate 200, and a first fastening member 520 fastening the first fixing member 420 to the first chassis 100.

The first chassis 100 has a space to receive constituent elements of the display device and includes a bottom surface, and a side wall extended from an edge of the bottom surface. The first chassis 100 includes a lower plate 102 and an upper plate 104 and the lower plate 102, which may be coupled to each other by a third fastening member 522. The upper and lower plates 104 and 102 are substantially parallel to each other, and partially contact each other. A groove 110 is on the side wall of the first chassis 100. The first chassis 100 may include a plurality of grooves 110.

The light guide plate 200 for uniformly transmitting light emitted from a light source (not shown) to the entire surface of the display device may include an acrylic injection-molded material. The light guide plate 200 includes a first protrusion 210 that protrudes from an edge of the light guide plate 200 and is inserted into the groove 110 of the first chassis 100. The light guide plate 200 may include a plurality of first protrusions 210.

The first protrusion 210 of the light guide plate 200 is inserted into the groove of the first chassis 100, such that the light guide plate 200 is fixed in X-axis and Y-axis directions with respect to the first chassis 100.

The first fixing member 420 contacts the first protrusion 210 of light guide plate 200. The first fixing member 420 includes a first fixing part 422 covering the portion of the side wall of the first chassis 100, and a second fixing part 426 bending toward an inside of the side wall of the first chassis 100 from the first fixing part 422 and contacting the first protrusion 210. The second fixing part 426 of the first fixing member 420 presses the first protrusion 210 of the light guide plate 200, such that the light guide plate 200 is fixed in a Z-axis direction with respect to the first chassis 100.

The first fixing part 422 and the second fixing part 425 of the first fixing member 420 may be bent in a '⊂' shape so as not to cover the groove 110 of the first chassis 100.

The first fastening member 520 may be a screw, and the first fixing part 422 of the first fixing member 420 and the first chassis 100 may be fastened by tightening the first fastening member 520 into aligned openings of the first fixing part 422 and the first chassis 100.

As shown in FIGS. 8 and 9, an additional view of the another exemplary embodiment of the display device according to the includes the first chassis 100, and may further include a sheet 300 positioned on the light guide plate 200, a second fixing member 430 covering a portion of the side wall of the first chassis 100 and contacting a top of the sheet 300 and a second fastening member 530 fastening the second fixing member 430 to the side wall of the first chassis 100. The light guide plate 200 in the additional view of FIGS. 8 and 9 does not include the first protrusion 210.

The sheet 300 includes a second protrusion 310 protruding from an edge thereof, and a hole 320 penetrating through a partial region of the second protrusion 310. A portion of the second fixing member 430 is inserted into the hole 320 of the sheet 300. The sheet 300 may include a plurality of second protrusions 310 and holes 320. The sheet 300 may be any of a number of various films, and examples thereof include, but are not limited to, a protection film, a diffusion film, and a luminance enhancement film.

The second fixing member 430 contacts the second protrusion 310 of the sheet 300. The second fixing member 430 includes a third fixing part 432 covering the portion of the side wall of the first chassis 100, and a fourth fixing part 436 bending toward an inside of the side wall of the first chassis 100 from the third fixing part 432. The fourth fixing part 436 itself may have a substantially '⊂' shape. The fourth fixing part 436 may include a first portion extending directly from the third fixing part 432 and a second portion extending directly from the first portion downward towards the bottom surface of the first chassis 100. An upper portion of third fixing part 432, and the first and second portions collectively form the '⊂' shape.

The distal end (e.g., the second portion) of the fourth fixing part 436 of the second fixing member 430 is inserted into the hole 320 of the sheet 300 while contacting and pressing the second protrusion 310 of the sheet 300, such that the sheet 300 is fixed in X-axis, Y-axis, and Z-axis directions with respect to the first chassis 100 in the plan view.

The second fastening member 530 may be a screw, and the second fixing member 430 and the first chassis 100 may be fastened by tightening the second fastening member 530 into aligned openings of the second fixing member 430 and the first chassis 100.

Still another exemplary embodiment of a display device according to the invention will be described hereafter with reference to the accompanying drawings.

Figure 10:
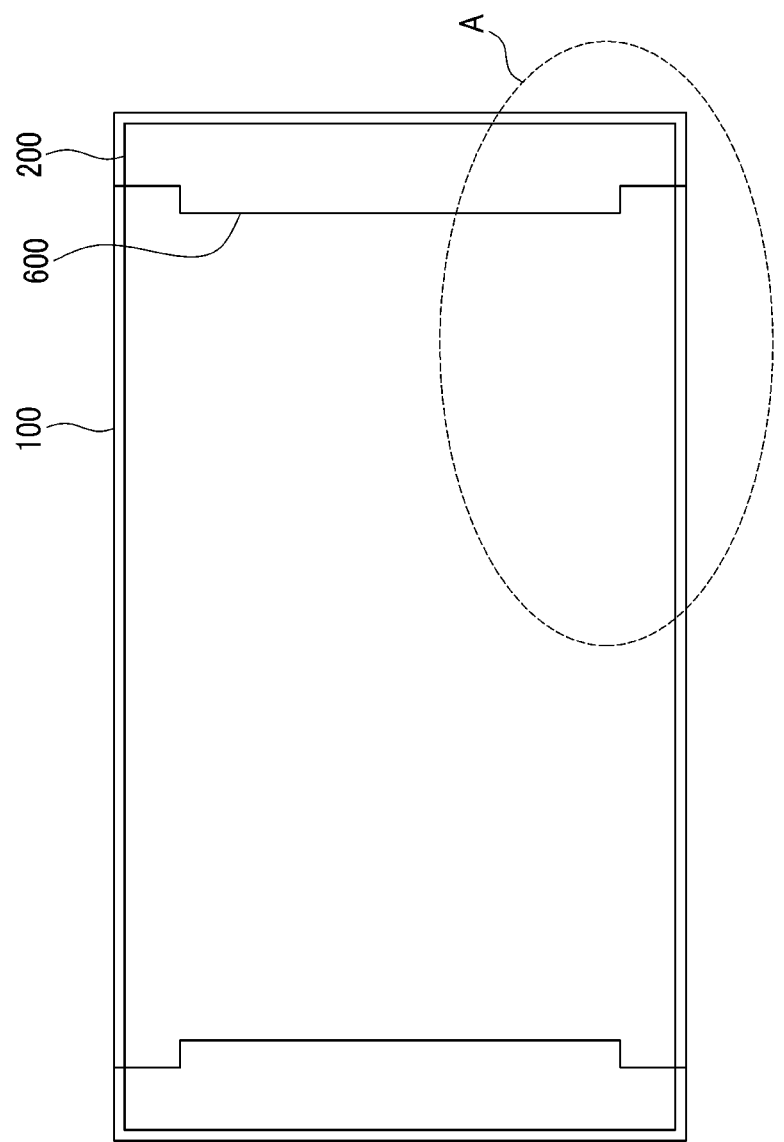
FIG. 10 is a top plan view of still another exemplary embodiment of a display device according to the invention.
Figure 11:
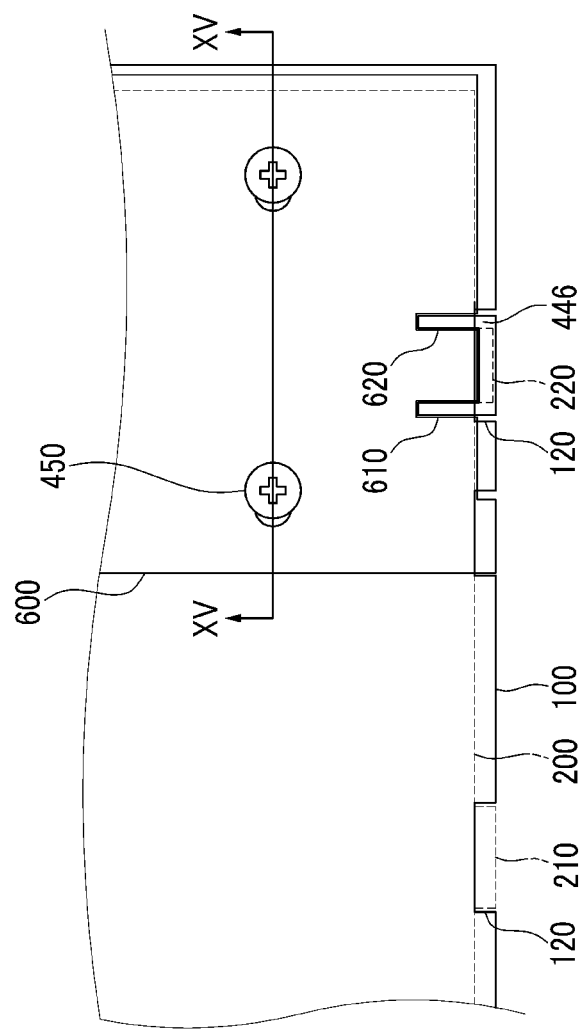
FIG. 11 is an enlarged top plan view of part A shown in FIG. 10.
Figure 12:
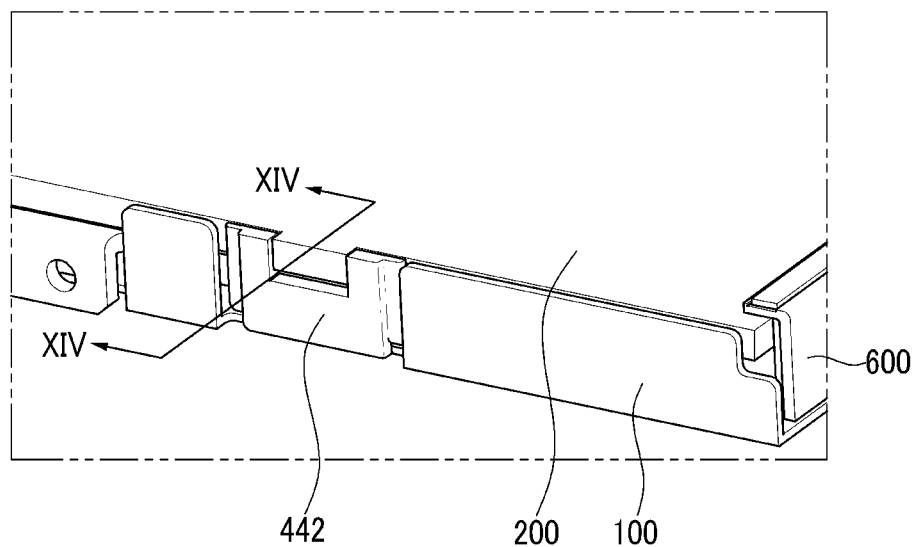
FIG. 12 is a partial perspective view of the display device of FIG. 10 according to the invention.
Figure 13:
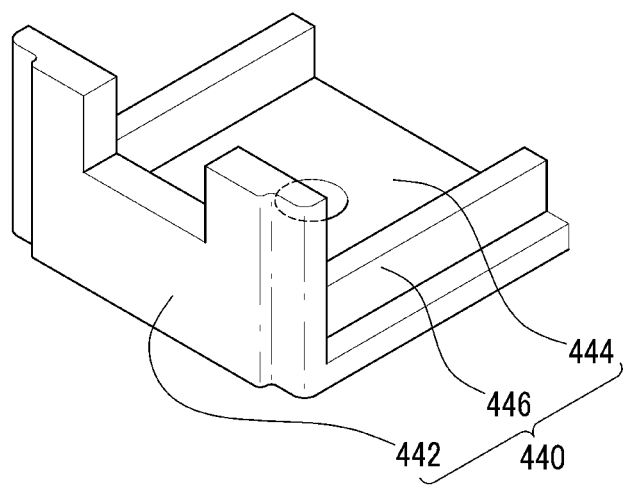
FIG. 13 is a perspective view illustrating an exemplary embodiment of a first fixing member of the display device of FIG. 12 according to the invention.
Figure 14:
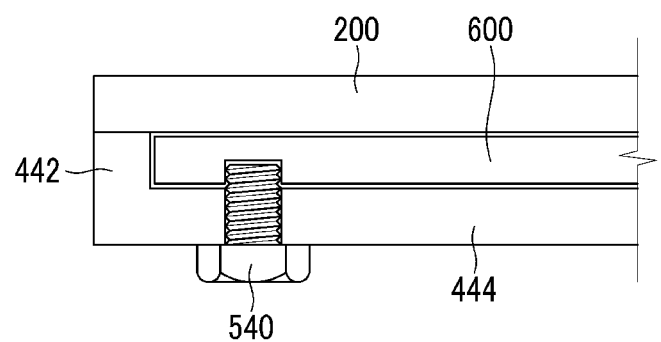
FIG. 14 is a cross-sectional view taken along line XIV-XIV of FIG. 12.
Figure 15:
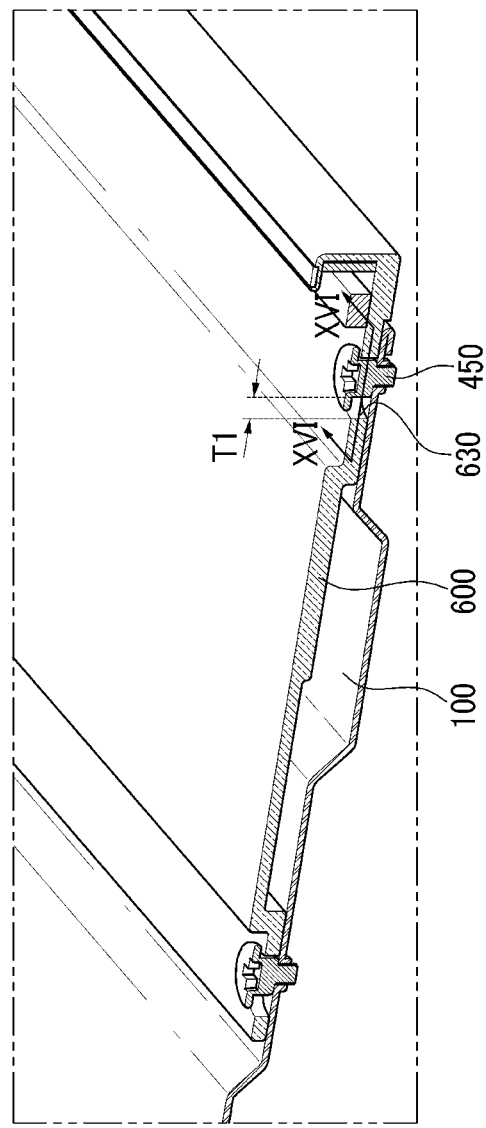
FIG. 15 is a partial cross-sectional perspective view taken along line XV-XV of FIG. 11 according to the invention.
Figure 16:
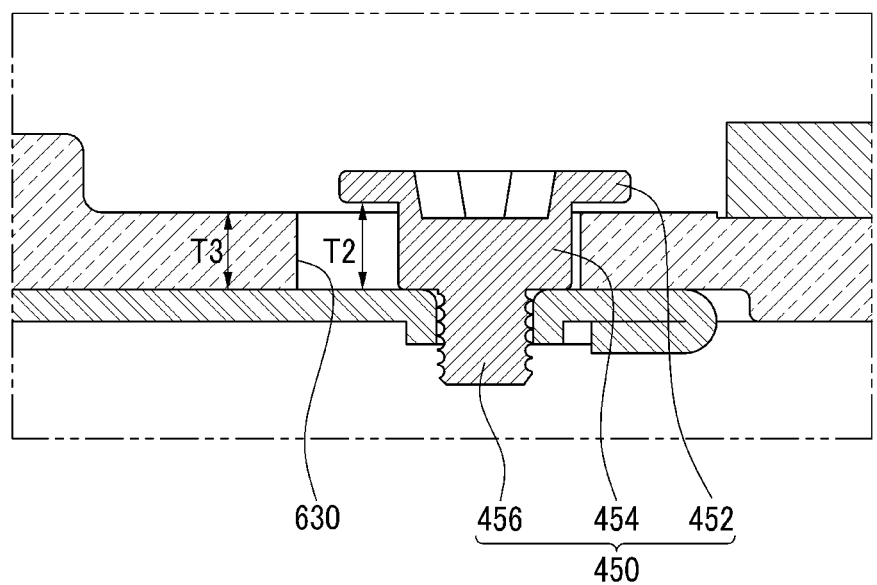
FIG. 16 is a cross-sectional view taken along line XVI-XVI of FIG. 15.
Figure 17:
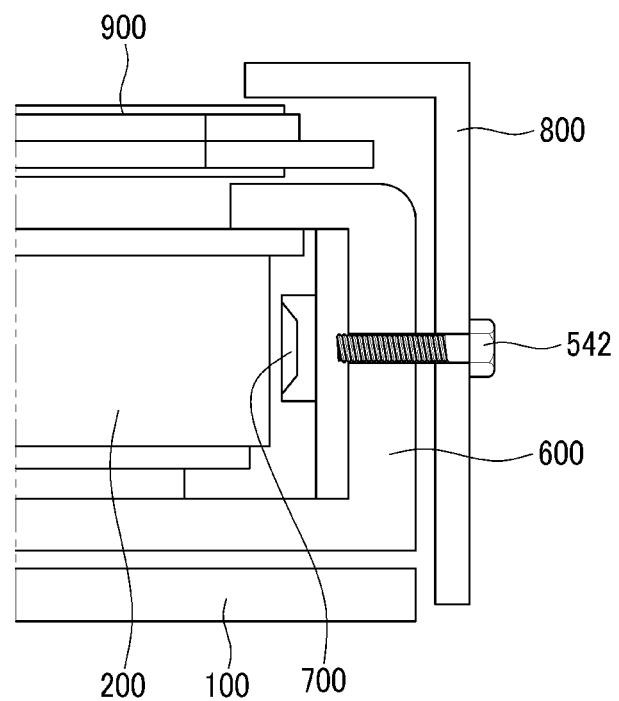
FIGS. 17 and 18 are cross-sectional views of the display device of FIG. 10 according to the invention.
Figure 18:
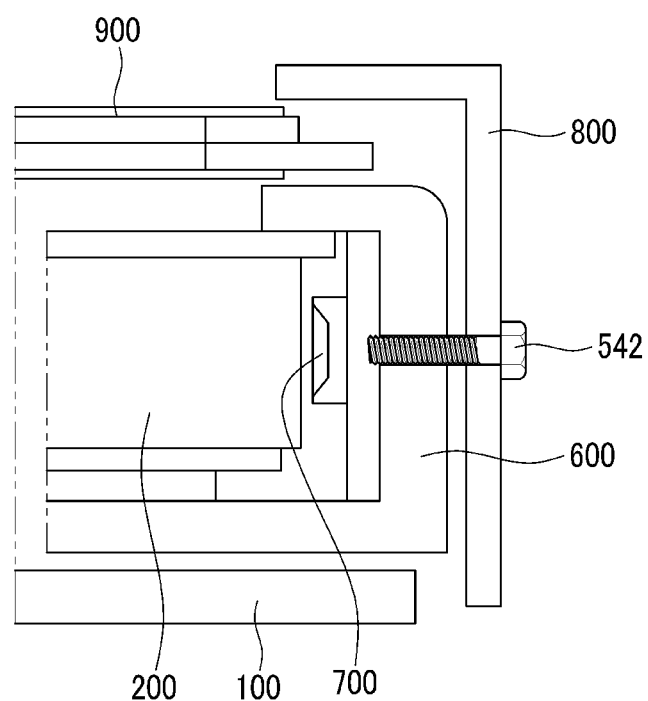
Figure 19:
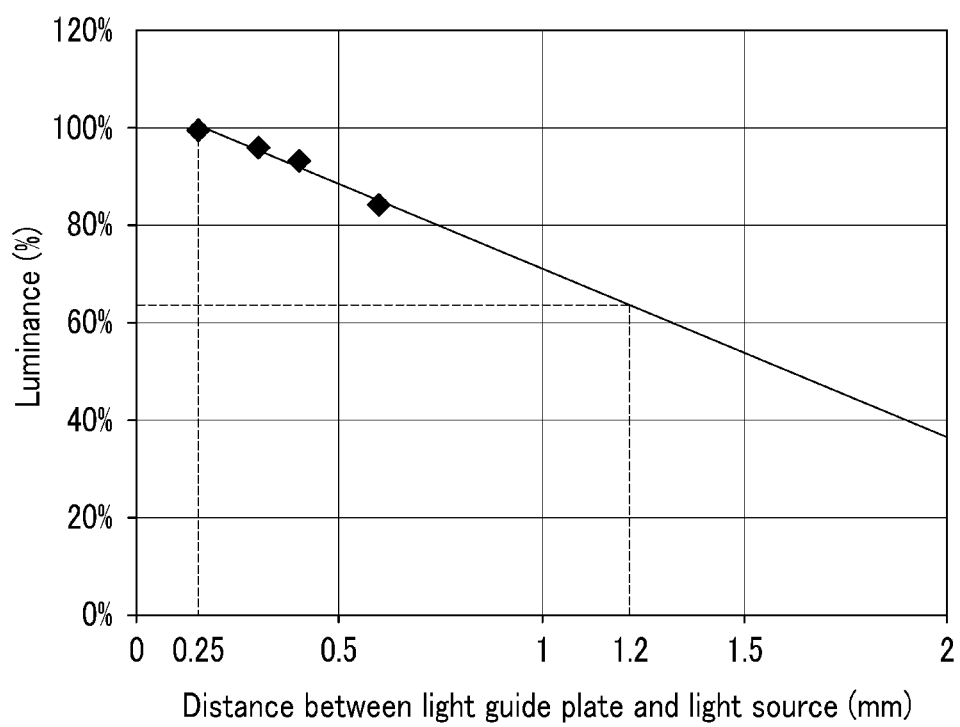
FIG. 19 is a graph illustrating luminance depending on the distance between a light guide plate and a light source.

FIG. 10 is a top plan view of still another exemplary embodiment of a display device according to the invention, FIG. 11 is an enlarged top plan view of part A shown in FIG. 10, FIG. 12 is a partial perspective view of the display device of FIG. 10 according to the invention, FIG. 13 is a perspective view illustrating an exemplary embodiment of a first fixing member of the display device of FIG. 12 according to the invention, FIG. 14 is a cross-sectional view taken along line XIV-XIV of FIG. 12, FIG. 15 is a partial cross-sectional perspective view along line XV-XV of FIG. 11 according to the invention, FIG. 16 is a cross-sectional view taken along line XVI-XVI of FIG. 15, FIGS. 17 and 18 are cross-sectional views of the display device of FIG. 10 according to the invention, and FIG. 19 is a graph illustrating luminance (in percent, %) depending on the distance between a light guide plate and a light source (in mm).

The display device includes a first chassis 100, an auxiliary chassis 600 movably fixed to the first chassis 100, and a light guide plate 200 received in the first chassis 100 and the auxiliary chassis 600 and fixed to the auxiliary chassis 600.

The first chassis 100 has a space to receive constituent elements of the display device and includes a bottom surface, and a side wall extended from an edge of the bottom surface. The first chassis 100 may have a substantially quadrangular shape. A first groove 120 is on the side wall of the first chassis 100. The first chassis 100 may include a plurality of first grooves 120.

The auxiliary chassis 600 is positioned on two opposing sides of the first chassis 100 facing each other, and movably fixed to the bottom surface of the first chassis 100.

The light guide plate 200 includes a first protrusion 210 that protrudes from an edge of the light guide plate 200 and is inserted into the first groove 120 of the first chassis 100, and a second protrusion 220 that has a width smaller than that of the first groove 120 and protrudes from the edge of the light guide plate 200. The light guide plate 200 may include a plurality of first protrusions 210 and second protrusions 220.

The first protrusion 210 of the light guide plate 200 is inserted into the first groove 120 of the first chassis 100, such that the light guide plate 200 is fixed in X-axis and Y-axis directions with respect to the first chassis 100.

As shown in FIGS. 11 to 14, the display device may further include a first fixing member 440 fixing the light guide plate 200 to the auxiliary chassis 600, and a first fastening member 540 fastening the first fixing member 440 to the auxiliary chassis 600.

The first fixing member 440 includes a first fixing part 442 formed in a '⊂' shape to surround the second protrusion 220 of the light guide plate 200, a second fixing part 444 bending from the first fixing part 442 and positioned beneath the auxiliary chassis 600, and a third fixing part 446 protruding from the second fixing part 444.

The first fixing part 442 of the first fixing member 440 engages with the second protrusion 220 of the light guide plate 200, such that the light guide plate 200 is fixed in X-axis and Y-axis directions with respect to the auxiliary chassis 600.

The auxiliary chassis 600 includes a second groove 610 and a third groove 620 extending toward an inside of the auxiliary chassis 600 from a lateral surface of the auxiliary chassis 600. The second groove 610 and the third groove 620 are concavely dented in a direction toward the inside the auxiliary chassis 600 from a portion corresponding to a distal end the second protrusion 220 of the light guide plate 200. In this case, the second groove 610 and the third groove 620 are dented at a right angle to the lateral surface of the auxiliary chassis 600, and the second groove 610 and the third groove 620 may have substantially the same shape.

The third fixing part 446 of the first fixing member 440 protrudes from the second fixing part 444 and is inserted into the second groove 610 and the third groove 620 of the auxiliary chassis 600. The third fixing part 446 of the first fixing member 440 is inserted into the second groove 610 and the third groove 620 of the auxiliary chassis 600, such that the auxiliary chassis 600 is fixed in X-axis and Y-axis directions with respect to the light guide plate 200.

The first fastening member 540 fastens the second fixing part 444 of the first fixing member 440 to the auxiliary chassis 600. The first fastening member 540 may be a screw, and the second fixing part 444 of the first fixing member 440 and the auxiliary chassis 600 may be fastened to each other by tightening the first fastening member 540 into aligned openings of the second fixing part 444 and the auxiliary chassis 600. The first fixing member 440 and the auxiliary chassis 600 may be more tightly coupled with each other by the first fastening member 540.

As shown in FIGS. 15 and 16, the display device may further include a second fixing member 450 movably fixing the auxiliary chassis 600 to the first chassis 100.

The second fixing member 450 includes a cylindrical head part 452, a cylindrical moving part 454 extended from the head part 452, and a fastening part 456 extended from the moving part 454 and having a threaded outer surface.

The auxiliary chassis 600 may include a hole 630 through which the second fixing member 450 passes.

The head part 452 has a diameter larger than that of the hole 630 so that the auxiliary chassis 600 is fixed not to move in a Z-axis direction with respect to the first chassis 100.

The moving part 454 has a diameter smaller than that of the hole 630 so that the auxiliary chassis 600 may move in X-axis and Y-axis directions with respect to the first chassis 100. In this case, the distance of the auxiliary chassis 600 movable with respect to the first chassis 100 corresponds to a difference $T_1$ between the diameters of the moving part 454 and the hole 630. A specific value of the difference $T_1$ between the diameters of the moving part 454 and the hole 630 will be described below with reference to FIGS. 17 and 18.

The light guide plate 200 is fixed to the first chassis 100 and the auxiliary chassis 600, and the auxiliary chassis 600 is movably fixed to the first chassis 100, such that when the light guide plate 200 is deformed due to temperature and humidity, the auxiliary chassis 600 moves in X-axis and Y-axis directions with respect to the first chassis 100.

The height $T_2$ of the moving part 454 may be larger than the thickness $T_3$ of the auxiliary chassis 600. This is because when the height $T_2$ of the moving part 454 is the same as the thickness $T_3$ of the auxiliary chassis 600, a bottom surface of the head part 452 of the second fixing member 450 is closely contacted with the auxiliary chassis 600, and thus it may be difficult for the auxiliary chassis 600 to move. That is, the auxiliary chassis 600 may move easily in the X-axis and Y-axis directions with respect to the first chassis 100 because there is a space in each of the X-axis, Y-axis and Z-axis direction, between the head part 452 and the auxiliary chassis 600.

Since the fastening part 456 has the diameter smaller than that of the hole 630, the fastening part 456 may pass through the hole 630. The fastening part 456 may be a screw and is tightened into a corresponding hole in the first chassis 100.

As shown in FIGS. 17 and 18, the display device may further include a light source 700 fixed to a lateral surface of the auxiliary chassis 600 and the light source 700 faces a lateral surface of the light guide plate 200.

If the auxiliary chassis 600 is fully fixed with respect to the first chassis 100 in spite of deformation of the light guide plate 200, the distance between the light source 700 and the light guide plate 200 is gradually reduced to influence each other. According to the exemplary embodiment, since the light source 700 is fixed to a lateral surface of the auxiliary chassis 600, as the light guide plate 200 is deformed, the auxiliary chassis 600 moves and as a result, the distance between the light source 700 and the light guide plate 200 is uniformly maintained to prevent the influence.

Accordingly, the difference $T_1$ between the diameters of the moving part 454 and the hole 630 may be designed depending on the deformation degree of the light guide plate 200. The deformation degree of the light guide plate 200 depends on a diagonal length of a liquid crystal panel of the display device. In one exemplary embodiment, for example, when the diagonal length of the liquid crystal panel is about 55 inches, about 46 inches, and about 40 inches, the difference $T_1$ between the diameters of the moving part 454 and the hole 630 may be designed to be approximately 1.2 millimeters (mm), approximately 1.0 mm, and approximately 0.8 mm, respectively.

In addition, the light guide plate 200 and the light source 700 have the uniform distance to prevent mutual interference. In the display device of the illustrated exemplary embodiment of FIG. 17, since the auxiliary chassis 600 to which the light source 700 is fixed moves depending on the deformation of the light guide plate 200, it is possible to minimize the distance between the light guide plate 200 and the light source 700.

As shown in FIG. 19, as the distance between the light guide plate 200 and the light source 700 decreases, luminance increases. This is because as the light guide plate 200 and the light source 700 become closer, the percentage at which light emitted from the light source 700 is incident on the light guide plate 200 increases.

In a structure where the auxiliary chassis 600 does not move, when the distance between the light guide plate 200 and the light source 700 is set to be about 1.2 mm so as to prevent interference therebetween, the luminance is approximately 65%. In the exemplary embodiment, when the distance between the light guide plate 200 and the light source 700 is set to be about 0.6 mm, 0.25 mm, and 0.15 mm, the luminance may be improved to approximately 84%, 96%, and 100%, respectively.

As shown in FIGS. 17 and 18, the display device may further include a liquid crystal panel 900 received on the auxiliary chassis 600, a second chassis 800 surrounding an edge of the liquid crystal panel 900 and fixed to the auxiliary chassis 600, and a second fastening member 542 fastening the second chassis 800 to the auxiliary chassis 600.

As described above, as the light guide plate 200 is deformed, the auxiliary chassis 600 moves with respect to the first chassis 100 and the second chassis 800 is fixed to the auxiliary chassis 600, such that the second chassis 800 moves together as the auxiliary chassis 100 moves.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
    a first chassis including:
        a bottom surface,
        a side wall which extends from an edge of the bottom surface, and
        a groove defined in the side wall of the first chassis;
    a light guide plate in the first chassis and defining a first protrusion protruding from an edge thereof, the first protrusion disposed in the groove of the side wall of the first chassis;
    a first fixing member which covers the side wall of the first chassis and an upper surface of the first protrusion, and contacts the upper surface of the first protrusions; and
    a first fastening member which penetrates the first fixing member and the first chassis so as to fasten the first fixing member to the side wall of the first chassis.

2. The display device of claim 1, wherein:
    the first fixing member includes
        a first fixing part which overlaps the side wall of the first chassis and is parallel to the side wall;
        a bending part which extends from the first fixing part toward an inside of the side wall of the first chassis; and
        a second fixing part which extends from the bending part toward the bottom surface of the first chassis, and contacts the upper surface of the first protrusion of the light guide plate.

3. The display device of claim 2, further comprising:
    a sheet in the first chassis and on the light guide plate,
    wherein the sheet includes
        a second protrusion which protrudes from an edge of the sheet and is parallel to the first protrusion of the light guide plate; and
        a hole which penetrates through a thickness of the second protrusion, and the second fixing part of the first fixing member extends into the hole of the sheet.

4. The display device of claim 1, wherein:
    the first fixing member includes
        a first fixing part which overlaps the side wall of the first chassis and is parallel to the side wall; and
        a second fixing part which extends from the first fixing part toward an inside of the side wall of the first chassis, and contacts the upper surface of the first protrusion of the light guide plate.

5. The display device of claim 4, further comprising:
    a sheet in the first chassis and on the light guide plate;
    a second fixing member which overlaps the side wall of the first chassis, is parallel to the side wall, and contacts an upper surface of the sheet; and
    a second fastening member which fastens the second fixing member to the side wall of the first chassis.

6. The display device of claim 5, wherein:
    the sheet includes
        a second protrusion which protrudes from an edge of the sheet; and
        a hole which penetrates through a thickness of the second protrusion, and the second fixing member extends into the hole of the sheet.

* * * * *